United States Patent [19]

Masonek et al.

[11] Patent Number: 4,720,219

[45] Date of Patent: Jan. 19, 1988

[54] REBORING TOOL

[76] Inventors: Steven J. Masonek, 7475 Cana Hwy., Chico, Calif. 95926; Frederick N. Rabo, 2120 Oró-Chico Hwy., Durham, Calif. 95938

[21] Appl. No.: 36,334

[22] Filed: Apr. 9, 1987

[51] Int. Cl.⁴ ............................................. B23B 51/08
[52] U.S. Cl. ..................................... 408/201; 30/172; 30/500; 408/225; 408/228; 408/713
[58] Field of Search ............... 408/201, 225, 227, 228, 408/713; 30/172, 500; 409/138–140

[56] References Cited

U.S. PATENT DOCUMENTS 3,289,297 12/1966 Casselman et al. ............... 30/172 X
3,358,531 12/1967 Schaffler ............................ 408/201
4,580,934 4/1986 McCormick ....................... 408/201

*Primary Examiner*—Gil Weidenfeld

[57] ABSTRACT

The invention provides a specialty tool useful for cleaning out broken off or cut off plastic pipe and glue in plastic fittings and plastic couplers. An arbor for use with a manual or electrical operated drill is provided with a smooth portion and a threaded portion. The threaded portion terminates in a screw head. Positioned on the arbor adjacent the screw head is an internal guide disc sized to fit inside the broken off or cut off plastic pipe to be removed from the plastic fitting or coupler. A circular cutting head having sharpened protrusions along the circumference is positioned next to the internal guide disc. A retaining nut slipped down over the smooth arbor shaft is tightened down against the circular cutter and retains both the cutter and the internal guide disc firmly on the arbor shaft. The assembled device is useful for the removal of broken off or cut off plastic pipe remaining in an otherwise useable plastic fitting or coupling.

8 Claims, 6 Drawing Figures

REBORING TOOL

BACKGROUND OF THE INVENTION

1. Field of the Invention

This invention relates to tools and bits useful for reboring plastic pipe fittings to clean interior walls for reuse of the fitting. The tools and bits involved are mostly used with manual and electrical drills. The present invention is particularly directed towards a multi-purpose tool having a cutting unit and a guiding collar.

2. Description of the Prior Art

The use of drill bits both manually and electrically driven are inadequate for cleaning out residue of broken plastic pipe so the original bore can be reused to save the fitting. Tools actually designed for the purpose of reboring used plastic pipe fitting are not available. Although rotary cutting tools and tube working tools are seen in the past art, no tools appear to be designed specifically for reboring used plastic pipe fittings.

Patents seen as partially criterion for the developing art would include the following:

1. A patent issued to J. H. Williams U.S. Pat. No. 1,884,460, date Oct. 25, 1932, shows a facing tool which is primarily useful for refacing automobile motor valves.

2. The Feb. 13, 1945, patent issued to H. S. Bakewell, U.S. Pat. No. 2,369,273, is an adjustable rotary cutting tool used stationary or as a revolving unit for fixed drilling.

3. In a patent issued Aug. 28, 1973, to Stickler, U.S. Pat. No. 3,754,832, a device for deburring plastic pipe is illustrated.

4. The electrician's tool shown in U.S. Pat. No. 3,763,510, granted to Graham on Oct. 9, 1973, is used for reaming the cutting edges of tubular electrical conduit.

5. The patent dated Mar. 11, 1975, issued to Strybel, U.S. Pat. No. 3,870,432, is a tube working tool useful as a reamer and deburring tool for the end of a metal tube.

6. A manual reamer for thin wall tubing is shown in U.S. Pat. No. 3,990,806, granted Nov. 9, 1976, to Meyers.

7. U.S. Pat. No. 4,175,895, dated Nov. 27, 1979, to Burroughs shows another tool for deburring the end of thin wall tubing.

8. W. McCormick shows a hole sizing tool used primarily in woodworking for enlarging an existing hole. His patent is U.S. Pat. No. 4,580,934, and is dated Apr. 8, 1986.

In the past art patents examined there do not seem to be any tools structured specifically for the removal of the broken or cut off piece of plastic pipe remaining in a still useable plastic joint or a plastic fitting.

SUMMARY OF THE INVENTION

In practicing our invention, we provide a threaded arbor fitted centrally through an internal guide disc and a cutting disc held in place by a left-handed retainer nut. The assemblage is designed for use in the chuck of a rotary powered drill or a manually operated drill. The internal guide disc positions the cutter so the cutting action removes only the broken pipe and glue remaining in the fitting, thus restoring the plastic pipe fitting for reuse.

Therefore, it is a primary object of our invention to provide a reboring tool useful for the removal of pipe and glue left in a plastic pipe fitting after the pipe has been broken or cut off of the fitting.

Another object of our invention is to provide a cutting tool which can be used in a power drive drill, in a manually operated drill, or in a brace and bit.

A still further object of the invention is to provide a tool having interchangeable guides and cutting discs so as to accommodate various sizes of plastic fittings and pipes.

Another object of this invention is to provide a tool which adapts readily to varying cutting needs and applications.

Other objects and the many advantages of the present invention will be readily understood by reading the following specification and the numbered parts therein and comparing them with like numbered parts in the accompanying drawings.

Figure 1:
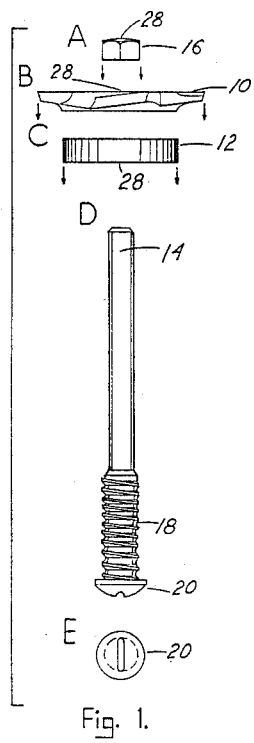
FIG. 1 is an exploded view of the various parts of the reboring tool constituting the present invention with the left-handed retainer nut at A, the cutting head at B, the internal guide disc at C, the arbor at D, and showing a top view of the arbor screw head at C.

DRAWING REFERENCE NUMERALS 10 cutting head
12 internal guide disc
14 arbor
16 left-handed retainer nut
18 arbor thread
20 arbor screw head
22 backing washer
24 multi-toothed cutting head
26 enlarged internal guide disc
28 attachment apertures
30 illustrative plastic pipe repair
32 broken plastic pipe
34 plastic pipe fitting
36 drill chuck
38 electric drill
40 brace and bit

DESCRIPTION OF PREFERRED EMBODIMENTS

Figure 2:
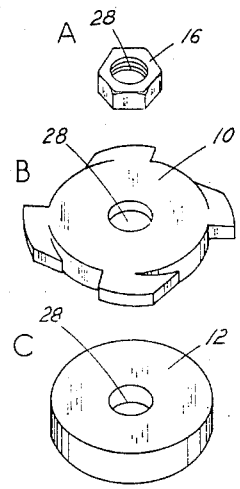
FIG. 2 is a perspective view of the left-handed retainer nut at A, the cutting head at B, and the internal guide disc at C.
Figure 3:
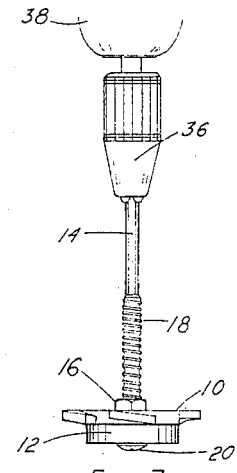
FIG. 3 illustrates the assembled reboring tool positioned in the chuck of an electric drill for use.

Referring now to the drawings and to FIG. 1. In FIG. 1, the reboring tool constituting the present invention is shown in an expleded view. Left-handed retainer nut 16 is shown at A and attachment aperture 28 is indicated. At B, cutting head 10 is shown in a side veiw with attachment aperture 28 indicated. Internal guide disc 12 is shown at C with attachment aperture 28 indicated. Arbor 14 is shown at D with the smooth shaft upwardly positioned and thread 18 shown downwardly adjacent arbor screw head 20. The screw grove is shown in a top view at E in arbor screw head 20. Three principal parts of the tool as shown in FIG. 2 include left-handed retainer nut 16 at A, cutting head 10 at B, and internal guide disc 12 at C. In all illustrations attachment aperture 28 can be seen centrally aligned. The assembled reboring tool is illustrated in FIG. 3 with arbor 14 held in drill chuck 36 of electric drill 38. The positioning of internal guide disc 12 adjacent arbor screw head 20 is illustrated. Cutting head 10 is held firmly against internal guide disc 12 by left-handed retainer nut 16 which slides down over the shaft of arbor 14 and is locked down by turning along threads 18.

Figure 5:
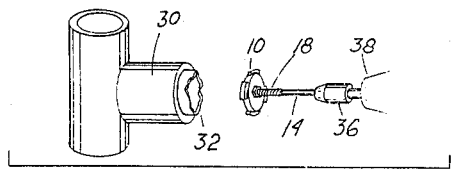
FIG. 5 illustrates the reboring tool used in the chuck of an electric drill for removing broken pipe from a plastic fitting.
Figure 6:
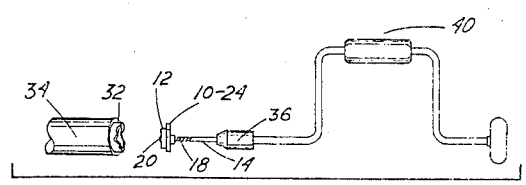
FIG. 6 shows the reboring tool used in the chuck of a brace and bit for removing broken pipe from a plast pipe fitting.
Figure 4:
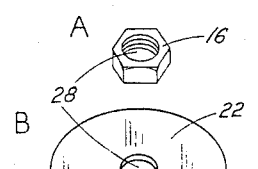
FIG. 4 shows alternate parts of the invention in a perspective drawing with the left-handed nut at A, a special enlarged backing washer at B, a multi-toothed cutting head at C, and an enlarged internal guide disc at D.
Figure 4:
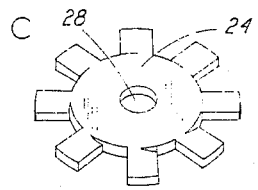
Figure 4:
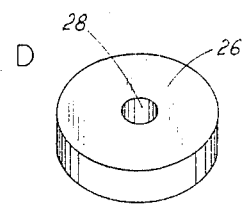

An embodiment for enlarged pipe or difficult applications is illustrated at FIG. 4. Left-handed retainer nut 16 is shown at A. Special backing washer 22 is shown at B. Multi-toothed cutting head 24 is shown at C. Enlarged internal guide disc 26 is shown at D. The alignment of the attachment apertures 28 is shown in the various parts shown at FIG. 4. FIG. 5 illustrates the reboring tool used in an electric drill to remove broken plastic pipe 32 from plast pipe fitting 30. FIG. 6 shows the reboring tool held in the chuck 36 of a brace and bit 40 for removing broken plastic pipe 32 from plastic pipe fitting 34.

Although we have described our invention with considerable details in the foregoing specification, it is to be understood that modifications in the structure and design of the tool and parts thereof may be practiced which do not depart from the intended scope of the appended claims.

What we claim as our invention is:

1. A reboring tool for removal of cut off or broken portions of plastic pipe and the glue that adheres the plastic pipe to the internal surface of plasic pipe fittings and plastic coupler joints, comprising:
   an arbor;
   said arbor a single shank member sectioned into two portions,
   there being a drill chuck receiving end portion and a tool securing end portion;
   said drill chuck receiving end portion constituting substantially one half the length of said shank is smooth surfaced to a diameter for transversing a retainer nut;
   said tool securing end portion threaded to receive said retainer nut, said threads terminating at a screw nut head;
   an internal guide disc;
   said internal guide disc being cylindrically sized to the internal diameter of the portion of pipe to be removed, there being a centrally aligned aperture for passage of said arbor therethrough;
   a cutting head;
   said cutting head having multiple protrusions radially aligned at the circumference of a support disc with said protrusions angled and sharpened to produce plastic chips when rotated in contact with plastic pipe and said disc apertured centrally to accommodate said arbor;
   a retainer nut;
   said retainer nut sized to pass freely along said smooth portion end of said arbor shank and threaded cooperatively with said threaded portion of said arbor shank;
   said reboring tool constituting the assemblage of said internal guide disc positioned through said aperture on said threaded portion of said arbor shank adjacent said shank screw head and juxtaposed with said cutting head similarly attached and having said internal guide disc and said cutting head secured by said retainer nut tightened on said arbor shank threaded portion bearing against said cutting head.

2. The reboring tool of claim 1 wherein the diameter of said arbor varies to accommodate plastic fitting sizes and drill chuck openings.

3. The reboring tool of claim 1 wherein said retainer nut and said threaded portion of said arbor shank are cooperatively fitted with left-handed threads.

4. The reboring tool of claim 1 wherein said retainer nut and said threaded portion of said arbor shank are cooperatively fitted with right-handed threads.

5. The reboring tool of claim 1 wherein said arbor and said cutting head are structured of a hardened metalic material preferably hardened steel.

6. The reboring tool of claim 1 wherein said internal guide disc is manufactured of any suitable material including woods, plastics, and metals.

7. The reboring tool of claim 1 wherein a special washer as described in the specification and illustrated in the drawings is fitted next to said cutting head on said arbor and is the bearing surface for said retainer nut.

8. The reboring tool of claim 1 wherein said internal guide disc is variously sized to fit a variety of inner-wall circumferences of said broken and cut off plastic pipe.

* * * * *